(12) United States Patent
Xiao et al.

(10) Patent No.: US 8,099,442 B2
(45) Date of Patent: Jan. 17, 2012

(54) ROBUST GENERATIVE FEATURES

(75) Inventors: Jing Xiao, Cupertino, CA (US);
Kar-Han Tan, Santa Clara, CA (US);
Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 635 days.

(21) Appl. No.: 12/257,849

(22) Filed: Oct. 24, 2008

(65) Prior Publication Data

US 2010/0106998 A1   Apr. 29, 2010

(51) Int. Cl.
*G06F 17/30* (2006.01)

(52) U.S. Cl. .......................................... 707/803

(58) Field of Classification Search .............. 707/2, 737, 707/803; 706/15; 382/124
See application file for complete search history.

(56) References Cited

U.S. PATENT DOCUMENTS

| | | | |
|---|---|---|---|
| 6,888,960 | B2 | 5/2005 | Penev et al. |
| 7,877,388 | B1 * | 1/2011 | Lamping et al. ............... 707/737 |
| 2003/0108220 | A1 | 6/2003 | Jepson et al. |
| 2006/0224531 | A1 * | 10/2006 | Abrahao et al. ................ 706/15 |
| 2008/0101663 | A1 * | 5/2008 | Lo et al. ........................ 382/124 |

OTHER PUBLICATIONS

Cremers, D., et al., "A Generative Model Based Approach to Motion Segmentation", Pattern Recognition, Magdeburg, Sep. 2003.
Snyder, J., "Interval Analysis for Computer Graphics", SIGGRAPH '92 Chicago, Jul. 26-31,1992.

* cited by examiner

*Primary Examiner* — Etienne Leroux

(57) ABSTRACT

Disclosed are systems and methods for developing robust features for representing data. In embodiments, a linear generative model is computed using data. In embodiments, based upon a robustness measure, a set of features is selected. In embodiments, the set of features may be evaluated to gauge the capacity of the set of features to represent the data. Responsive to the set of features not satisfying an evaluation criterion or criteria, the set of features may be refined until the selected set of features complies with the evaluation criterion or criteria.

20 Claims, 9 Drawing Sheets

200

```
Identify candidate sets of features given the
linear generative model                              — 205

↓

Using the singular value product as a
robustness measure, calculate a singular
value product corresponding to each                  — 210
candidate set of features

↓

Select the candidate set of features that
corresponds with the largest singular value          — 215
product
```

FIGURE 2

ROBUST GENERATIVE FEATURES

BACKGROUND

A. Technical Field

The present invention relates generally to systems and methods for processing data, and more particularly, to systems and methods for developing a model comprising a set of robust generative features.

B. Background of the Invention

Mathematical models are often used to help understand, simulate, or predict systems, objects, or scenes. However, developing models can be very difficult for a number of reasons.

First, the dynamic properties of the item or items to be modeled make model generation difficult and complex. For example, objects, such as animated objects, have many properties, such as location, size, shape, appearance, and movement, each of which can vary with time. Developing a model that adequately represents such dynamics can be very difficult.

Further adding to the difficulty of developing a model is the problem of data capture. It is not always possible to capture all of the data that represents a system, a scene, or a set of objects. For example, an image captured by a camera may not cover the entire scene because of a limited field of view of the camera or because of occlusion of an object or objects in the scene.

Accordingly, there is a need for a way to develop models that can mitigate or address at least some of the issues provided above.

SUMMARY OF THE INVENTION

The present invention provides methods and systems for developing robust features with which to represent data. In embodiments, a method for selecting features for representing data comprising computing a linear model and using a reliability measure to select a set of features from the linear model to represent the data. The selected set of features is gauged using a robustness measure of the selected set of features to represent the data. If the robustness measure of the selected set of features exceeds a threshold, the number of features in the set of features is increased, and the steps of selecting a set of features and gauging robustness of the selected set of features is iterated until a preset condition is satisfied. In embodiments, the robustness measure may be a reconstruction error value and the first threshold may be a reconstruction error threshold. In embodiments, the steps of using a reliability measure to select a set of features from the linear model to represent the data may involve generating a plurality of candidate sets of features, calculating a singular value product for each candidate set of features, and selecting the candidate set of features that is correlated with the largest singular value product. In embodiments, dynamic programming methods may be used to generate and evaluate the plurality of candidate sets of features.

In embodiments, gauging a robustness measure of a selected set of features to represent the data includes adding noise to at least some of the data to produce noise-added data, using at least some of the noise-added data and a part of a set of model bases from the linear model that correspond to the set of features to calculate estimated coefficients for the linear model. The estimated coefficients are used with the linear model to generate reconstructed data, and a reconstruction error value is calculated for at least some of the reconstructed data relative to the corresponding data used to produce the noise-added data.

In embodiments, the number of features in the set of features may be increased by one or more until at least one of the following conditions is satisfied: a robustness measure of the selected set of features does not exceed the first threshold; a difference in reliability measure between two successive iterations of selected sets of features is below a second threshold value; and all of the features from the linear model have been included in the selected set of features.

In embodiments, a method for developing a generative model includes using data to calculate a set of model bases for a generative model. The number of features of the set of model bases may be reduced by iterating the following steps until a condition related to a reconstruction value has been satisfied: using a sensitivity value to select a set of features to form a reduced-feature-size set of model bases; and generating a reconstruction value of at least some of the data using the reduced-feature-size set of model bases. In embodiments, at an iteration, the number of features in the selected set of features is increased over the prior iteration. In embodiments, a condition related to a reconstruction value may be satisfied when the reconstruction value does not exceed a reconstruction error threshold. In embodiments, a condition related to a reconstruction value may also be satisfied when a difference between sensitivity values of the selected set of features and an immediately prior selected set of features is below a threshold value.

In embodiments, the steps of using a sensitivity value to select a set of features may include generating a plurality of candidate sets of features, and for a candidate set of features, calculating a singular value product for its corresponding reduced-feature-size set of model bases. The candidate set of features corresponding to the largest singular value product may be selecting for use as the set of features. In embodiments, dynamic programming methods may be used to generate and evaluate the plurality of candidate sets of features.

In embodiments, generating a reconstruction value of the set of features includes the steps of adding noise to at least some of the data to produce noise-added data; using the noise-added data and the reduced-feature-size set of model bases to calculate estimated coefficients for the generative model; using the estimated coefficients and the generative model to generate reconstructed data; and calculating a reconstruction value for at least some of the reconstructed data relative to the corresponding non-noise-added data.

Embodiments of the present invention may also be embodied in systems for developing a generative model. In embodiments, the system may be configured to perform at least one embodiment of the method disclosed or suggested herein.

In embodiments, a system may comprise a model generator, a generative features extractor, and a robustness evaluator. The model generator receives data and produces a linear generative model using the data. The generative features extractor that uses a reliability measure to select a set of features from the linear generative model. And, the robustness evaluator calculates a robustness error of the set of features, and responsive to a reconstruction error of the set of features exceeding a reconstruction error threshold, causes the generative features extractor to provide the robustness evaluator with another set of features with an increased number of features.

One skilled in the art shall recognize that the present invention may be contained in a computer-readable medium comprising instructions which, when executed by one or more processors, cause the one or more processors to perform at least one embodiment of the present invention.

Certain features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 2 depict a method for selecting a set of features using a robustness measure according to embodiments of the present invention.

DETAILED DESCRIPTION OF THE PREFERRED EMBODIMENTS

Figure 1:
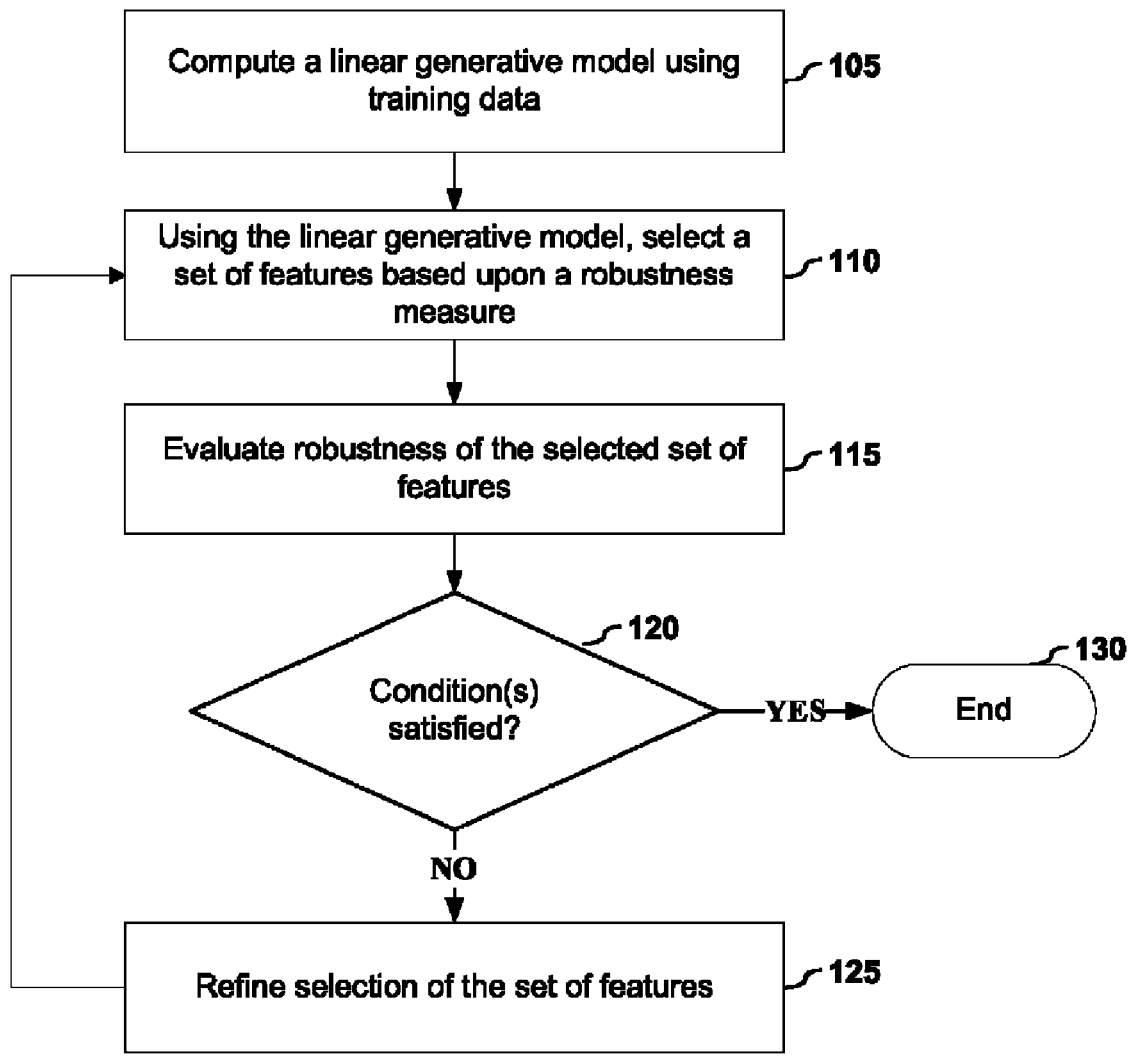
FIG. 1 depicts a method to develop robust generative features with which to represent data according to embodiments of the present invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including (without limitation) camera, scanners, printers, computers, facsimile machine, mobile devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment. In this disclosure, a set shall be construed to not have any restrictions on the number of elements that may be in (or not in) the set.

Generative models that capture static and non-static properties of subjects to be modeled have been used for understanding or simulating the world. In particular, linear generative models have been used for solving computer vision and computer graphics problems. For example, an eigenface model that models the facial appearances across people has been used for face recognition. A morphable model that represents the 3D shape deformation across various human faces has been used for tracking and reconstruction of faces; and a linear sub-space model of non-rigid body configurations has been used for computer animation of such bodies.

Typically, generative models are fitted to the measurements, such as images or motion captured data, to recover the properties of interests. The fitting process usually requires that the subjects be completely measurable. However, many measurement methods can typically capture part of the data. For example, a camera may not be able to cover the entire scene because of the limited field of view or occlusion of objects in the scene. In many instances, only a sparse set of dominant features can be reliably measured for other reasons, such as limited computational resources or noise.

In order to infer the missing part of a scene, two problems should to be resolved. First, it should be determined which dominant, or strong, features should be measured so that the entire scene can be reliably recovered using these dominant features. Second, it should be determined how to fit a generative model for the scene with a minimal number of such dominant features that can reconstruct the entire scene. For purposes of this disclosure, features that are sufficient to fit a generative model of an entire scene shall be referred to as the generative features.

FIG. 1 depicts an embodiment of a method to obtain robust generative features with which to represent data according to embodiments of the present invention. As illustrated in FIG. 1, a linear generative model is computed (105) using training data.

A linear generative model generally consists of a small number of model bases, and each model instance $S_i$ can be represented as a linear combination of those bases $B_k$ as illustrated by Equation A below:

$$S_i = \sum_{k=1}^{K} l_{ik} B_k \qquad \text{Equation A}$$

where K=the number of bases, and $l_{ik}$=the combination coefficient for the $k^{th}$ basis, $B_k$.

Linear generative models may be used to represent a number of different objects, such as expressive human faces, articulated body configurations, dynamic scenes, beating hearts, or growing brain tumors. Model instances corresponding to such objects are, respectively, facial features, body configurations, scene structures, heart deformations, or tumor shapes. These objects may be represented using one or more dimensions, such as two-dimensional or three-dimensional data. In embodiments, linear generative models are extracted from a plurality of aligned model instances or measured samples using Principal Component Analysis (PCA), Independent Component Analysis (ICA), or the like.

For purposes of explanation, the teachings of the present invention will be explained with reference to exemplary embodiments involving three-dimensional facial shapes. For purposes of explanation, the teachings of the present invention will also be illustrated using variable one-dimensional data, such as a sound. Accordingly, it should be noted that the examples provided herein are for purposes of explanation and not limitation. One skilled in the art shall recognize that the methods and systems disclosed herein may be readily applied to other objects and other situations. Such other applications are, therefore, within the scope of the present invention.

By way of example and not limitation, assume the existence of N aligned three-dimensional face shapes, $S_1, \ldots, S_N$. Each facial shape $S_i$ consists of n points having three-dimensional coordinates $(x_{i1}, y_{i1}, z_{i1}, \ldots, x_{in}, y_{in}, z_{in})$ or 3n features/coordinates. Facial shapes $S_1, \ldots, S_N$ can be considered measured training samples from which a model and sets of features may be identified, and against which those sets of features may be evaluated to determine whether a set of features reliably and accurately represent a shape S. The model instances or measured training samples embodied in facial shapes $S_1, \ldots, S_N$ thus constitute a set of ground truths relative to which the robustness of sets of generative features can be evaluated. From the N facial shapes, the K model bases $B_1, \ldots, B_K$ can be extracted using, for example, Principal Component Analysis, Independent Component Analysis (ICA), or the like. Each basis $B_k$ is a vector of n three-dimensional coordinates. Thus, each of the three-dimensional facial shapes $S_1, \ldots, S_N$ is a linear combination of the K of model bases arrived at by using Equation A, above.

Once a linear generative model has been computed, each three-dimensional face shape $S_i$ may be uniquely determined by the combination coefficients of the K model bases, since each three-dimensional face shape $S_i$ is a linear combination of the K model bases. Thus, given a three-dimensional shape $S_i$, it can be fit with the model using Equation A to compute the combination coefficients of the K model bases. In this embodiment, because $S_i$ and $B_k$ are both vectors of 3n features (n three-dimensional coordinates), Equation A provides 3n linear equations on the K unknown combination coefficients of the model bases as set forth in Equation B below:

$$\begin{pmatrix} b_{1x1} & \cdots & b_{Kx1} \\ b_{1y1} & \cdots & b_{Ky1} \\ b_{1z1} & \cdots & b_{Kz1} \\ \vdots & \vdots & \vdots \\ b_{1xn} & \cdots & b_{Kxn} \\ b_{1yn} & \cdots & b_{Kyn} \\ b_{1zn} & \cdots & b_{Kzn} \end{pmatrix} \begin{pmatrix} l_{i1} \\ \vdots \\ l_{iK} \end{pmatrix} = \begin{pmatrix} x_{i1} \\ y_{i1} \\ z_{i1} \\ \vdots \\ x_{in} \\ y_{in} \\ z_{in} \end{pmatrix} \quad \text{Equation B}$$

The 3n-by-K sized matrix to the left on the left side of Equation B is comprised of the K model bases and may be denoted simply as B. Each column in the matrix is a basis comprising a number of terms, and each term correlates to a feature. For example, $b_{1x1}$ correlates with coordinate $x_{i1}$. One skilled in the art will recognize that each row in matrix B correlates to the same feature. Because the number of points, n, is generally much larger than the number of model bases, K, the linear equation system of Equation B is overconstrained. Thus, Equation B can be resolved into a unique solution for the coefficients vector $(l_{i1}, \ldots, l_{iK})$, which vector may be denoted simply as $L_i$.

Since the linear system of Equation B is overconstrained, many of the linear equations are redundant. A set of K linear equations is sufficient to achieve a solution so long as the set of K linear equations are independent of each other. Thus, in the present embodiment, to compute the coefficients vector $L_i$, it is sufficient to have K out of the 3n coordinates/features in the shape vector $S_i$, to which the corresponding K of rows in B are independent. In embodiments, the K rows form a non-singular K-by-K sub-matrix of B, which may be denoted as $\hat{B}$. The corresponding K-by-1 sub-vector of $S_i$ may be denoted as $\hat{S}_i$.

It shall be noted that there may be a number of different groups of K features that correspond to non-singular sub-matrices $\hat{B}$. In noiseless cases, given any of these groups of coordinates, $\hat{S}_i$, the K coefficients can be exactly determined using Equation C below:

$$L_i = \hat{B}^{-1} \hat{S}_i \quad \text{Equation C}$$

Thus, the entire shape of all the 3n coordinates can be reconstructed precisely. However, it is rarely, if ever, the case that noise is not introduced into the measurements at some point. Accordingly, as depicted in the FIG. 1, when selecting a set of K linear independent equations, it is preferred to use a robustness measure when selecting (110) a set of K features.

Returning to the illustrated example of the face measurements, when noise exists, the 3n coordinates are not exactly measured. Thus, the measured values, $\hat{S}_i'$, may be represented as the actual values, $\hat{S}_i$, plus some noise, $\delta_i$, as illustrated in the following equation:

$$\hat{S}_i' = \hat{S}_i + \delta_i \quad \text{Equation D}$$

Accordingly, the coefficient vector $L_i'$ may be given by Equation E below:

$$L_i' = L_i + \hat{B}^{-1} \delta_i \quad \text{Equation E}$$

One skilled in the art shall recognize that the value $\hat{B}^{-1} \delta_i$ determines the noise sensitivity of the corresponding group of K coordinates. Thus, in cases where noise is present, the characteristic of $\hat{B}^{-1}$ determines the reliability of the fitting and reconstruction resulting from using the K coordinates, and may serve as a sensitivity or reliability or robustness measure.

In embodiments, the reliability or robustness of the model fitting and the reconstruction performance can be increased by selecting (110) the K features (the K features correspond to K rows in the 3n-by-K model bases B, thereby forming a K-by-K sub-model matrix, $\hat{B}$), for which the corresponding value of $\hat{B}^{-1} \delta_i$ is as small as possible. This condition occurs when the norm of $\hat{B}$ or $\|\hat{B}\|$, is as large as possible. Denoting the K singular values of $\hat{B}$ as $s_1, \ldots, s_K$, where $s_1 \geq \ldots \geq s_K$, then the relationship results that is expressed in Equation F below:

$$\|\hat{B}\|^2 = \sum_{k=1}^{K} s_k^2, \quad \text{Equation F}$$

where $\|\hat{B}\|$ represents the Frobenius norm of $\hat{B}$. One skilled in the art shall recognize that the K singular values may be obtained using singular value decomposition.

According to Equation F (above), the larger singular values result in larger norms of $\hat{B}$ and thus lower noise sensitivity/ more robust to noise. The Frobenius norm of $\hat{B}$ does not, however, take into account ill-conditioned cases in which, for example, one or more of the singular values is close to zero. In such cases, should any of the singular values be large, the Frobenius norm of $\hat{B}$ will be large.

FIG. 2 depicts a method (200) for selecting a set of features that avoids such misleading cases as described in the preceding paragraph. As depicted in FIG. 2, a set of candidate features are selected (205) given a linear generative model. In embodiments, the product of the singular values may be employed (210) as a measure that determines the reliability of the set of candidate features for fitting and reconstruction. In embodiments, the set of candidate features to which its corresponding singular value product produced the maximum value is selected (215) as having the best reliability. One skilled in the art shall recognize that this term is equivalent to the absolute value of the determinant of $\hat{B}$, of which the value increases with larger singular values and vanishes for close-to-zero singular values in the ill-conditioned cases.

Figure 3:
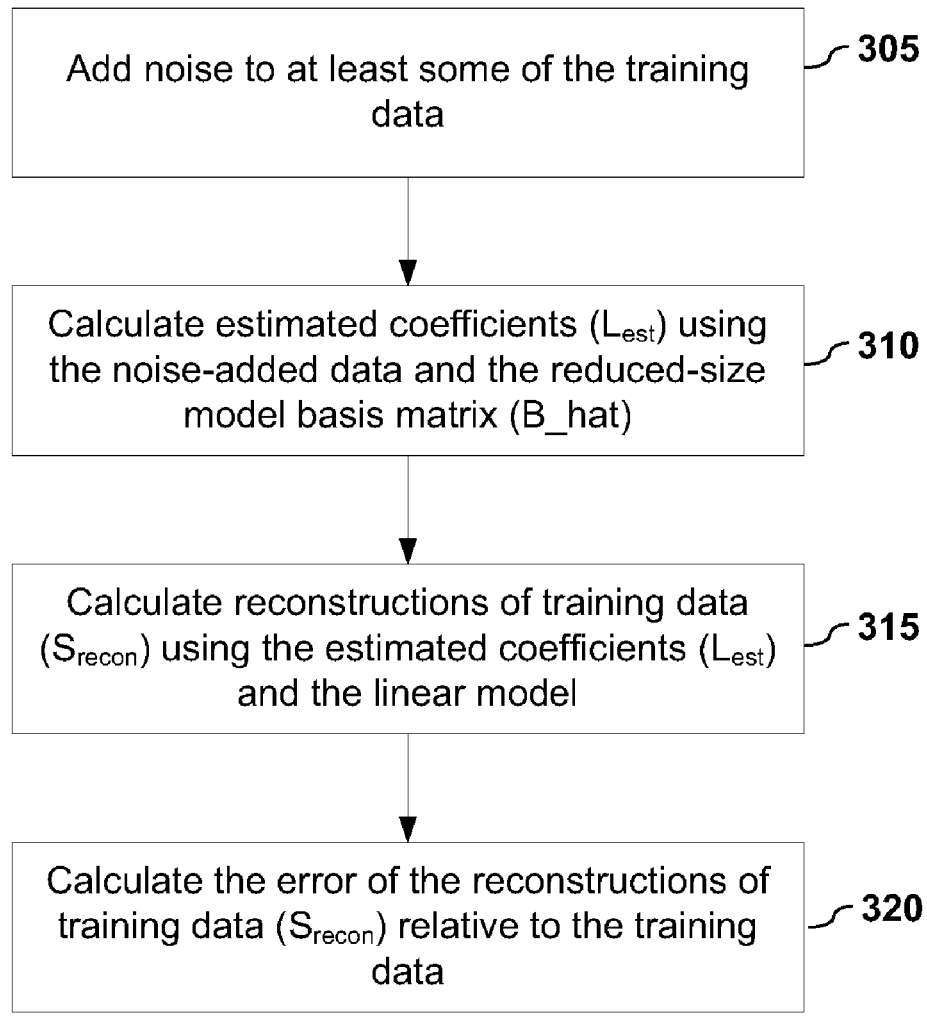
FIG. 3 depicts a method for gauging the robustness of a set of features according to embodiments of the present invention.

Following the selection of a set of features, the robustness of the selected set of features may be evaluated (115). FIG. 3 depicts a method 300 for evaluating the robustness of a selected group according to embodiments of the present invention.

In embodiments, Gaussian noise is added to the data to obtain a set of noisy data. Noise-containing data corresponding to the selected set of features, $\hat{S}_i'$, is used to fit (310) the model and to reconstruct (315) the entirety of the measurements, $S_i$. That is, given model bases that form a 3n-by-P matrix, denoted as B, the set of selected features correspond to R rows of the matrix form an R-by-P sub-matrix, $\hat{B}$. One skilled in the art shall recognize that determining the features relates to determining the indices in the model basis matrix. During this evaluation stage, the noisy data corresponding to the selected features, $\hat{S}_i'$, and the sub-matrix of the model bases corresponding to the selected features, $\hat{B}$, are used to calculate (310) a set of coefficients, $L_{est}$, according to the following equation:

$$L_{est} = \hat{B}^{-1}\hat{S}_i' \qquad \text{Equation G}$$

The estimated coefficients, $L_{est}$, may then be used to calculate reconstructions of the data, according to the following equation:

$$S_{recon} = \hat{B}L_{est} \qquad \text{Equation H}$$

The reconstruction error, if any, can be calculated (320) relative to the ground truth/original data to evaluate the robustness of the selected features. For example, in an embodiment, the reconstruction error may be calculated relative to the original data prior to the addition of the Gaussian noise according to the following equation:

$$\text{Error} = \frac{\|S - S_{recon}\|}{\|S\|} \qquad \text{Equation I}$$

where $\|.\|$ refers to the Frobenius Norm.

Returning to FIG. 1, in embodiments, the reconstruction error may act as a robustness condition (120) that can be evaluated. In embodiments, if the selected set of features results in an error that is greater than an error threshold (which threshold may be pre-set, user-selected, or both), the selection of the features may be refined (125). In embodiments, the number of features may be increased (125), and a new search undertaken (110) to identify the most reliable group that contains the increased number of coordinates. In this manner, the maximum singular value product of the newly selected coordinate group will be larger than the previous selected group, and thus, the reliability of fitting and reconstruction using the newly selected coordinate group will be improved relative to the preceding coordinate group. The smallest number of selected features, or coordinates in this particular example, with which it is possible to fit reliably the generative model to reconstruct the shape of the entire body (i.e., the reconstruction error is lower than a threshold value) may be referred to as the robust generative features for that body.

It should be noted that computing the generative features from a given linear generative model involves, in embodiments, a search for the group of K coordinates for which the associated singular value product of $\hat{B}$ is a maximum. In embodiments, this process entails computing the singular values of all possible groups of K different coordinates.

One skilled in the art shall recognize that evaluating all of the possible K different feature groups is a combinational task, in which dynamic programming methods may be employed. For example, in the illustrated embodiment, labeling the features ascendantly from 1 to 3n, the task may be divided into stages. At each of those stages, a decision may be rendered allocating one label as one of the K features. Each stage has a number of states, that is, the labels that are not allocated, from which one may be chosen. The decision rendered at the present stage transforms one state into a state in the next stage and given the current state the optimal decision for each of the remaining states does not depend upon the previous states or decisions. Because these are characteristics of dynamic programming problems, dynamic programming methods may be employed to evaluate all of the possible K feature groups and identify that feature group that has the maximum singular value product.

In embodiments, if the relative reconstruction error using the identified features is larger than a preset error threshold, $E_{max}$, the number of features may be increased, and the process discussed above may be repeated to identify the increased number of feature group with the best reliability/robustness. For example, in an embodiment, if a set of K features has a reconstruction error that is larger than the preset error threshold, the next iteration will use K+1 features. It should be noted that the number of features does not need to be iterated by only one feature per iteration, nor does the increase need to be the same size for each iteration. One skilled in the art shall also recognize expressing the robustness in terms of its error is equivalent to expressing it according to its accuracy (e.g., robustness may be expressed as requiring a reconstructed value being greater than a threshold (e.g., 95%) of the ground truth value).

Figure 4:
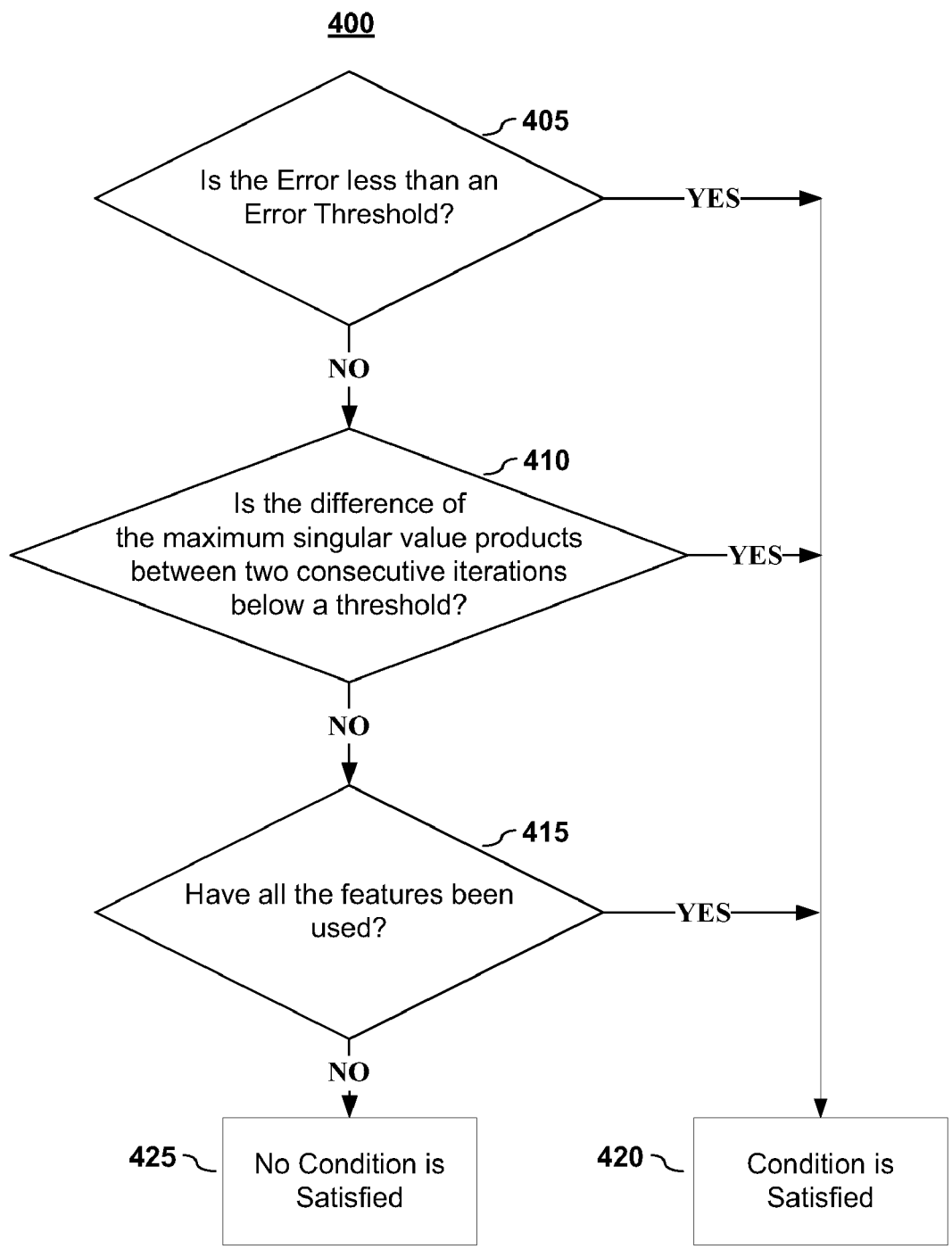
FIG. 4 depicts a set of conditions that may be examined in determining whether to iterate the selecting and evaluating of a set of features according to embodiments of the present invention.

As indicated in FIG. 1, these processes may be iterated until a criterion or criteria have been satisfied. FIG. 4 depicts an embodiment of a set of criteria that may be examined at step 120 of FIG. 1 according to embodiments of the present invention. As illustrated in FIG. 4, the process of selecting coordinate groups may be iterated until either of the following conditions occur: (1) the reconstruction error is less than a reconstruction error threshold (405); (2) the difference between the maximum singular value products achieved in two consecutive iterations is below a threshold (e.g., close to zero) (410); or (3) all the 3n available coordinates have been used (415). That is, if any of the three conditions is satisfied, the condition is satisfied 420. If none of the conditions is satisfied (425), the process may continue to iterate until at least one of the conditions is satisfied.

One skilled in the art shall recognize that other conditions and/or other configurations may be employed. For example, in embodiments, under either the second condition (410) or the third condition (415) above, the resulting coordinates employed may not be considered robust generative features. That is, in embodiments, when the condition is satisfied under the first condition, the group of coordinates may be considered a set of generative features that is capable of robust fitting and reconstruction of the entire body. However, in embodiments, if any one of the conditions is satisfied, the group of coordinates may be considered a best available set of generative features that is capable of robust fitting and reconstruction of the entire body.

One skilled in the art shall also recognize that since the number of deformation modes or model bases K is generally far smaller than the number of all the available coordinates (3n in the present example), the number of generative features, which is usually in the order of K, is also much smaller than the number of coordinates. Thus, the use of the generative features greatly improves the efficiency of fitting and reconstruction. One skilled in the art shall recognize that the generative features may also be used to improve the efficiency of other related applications, such as (by way of example and not limitation) tracking and animation.

To illustrate the effectiveness of the inventive systems and methods, a number of examples are presented herein. To aid in illustrating, the examples involve one-dimensional data. One-dimensional data, such as a speech signal, is typically subdivided into an ordered sequence of temporal segments. To efficiently and accurately store, reproduce, or manipulate such data, a compact representation of the data is sought that eliminates redundancy in the data. As will be seen from the test results that are presented in FIGS. 5-7, the inventive systems and methods help eliminate redundancy by identifying robust generative features with which to represent the data. For ease of comprehension, FIGS. 5-7 utilize one-dimensional data that exhibit progressively increasing variability, and thus entail manipulations of progressively increasing complexity in the identification of corresponding robust generative features.

Figure 5:
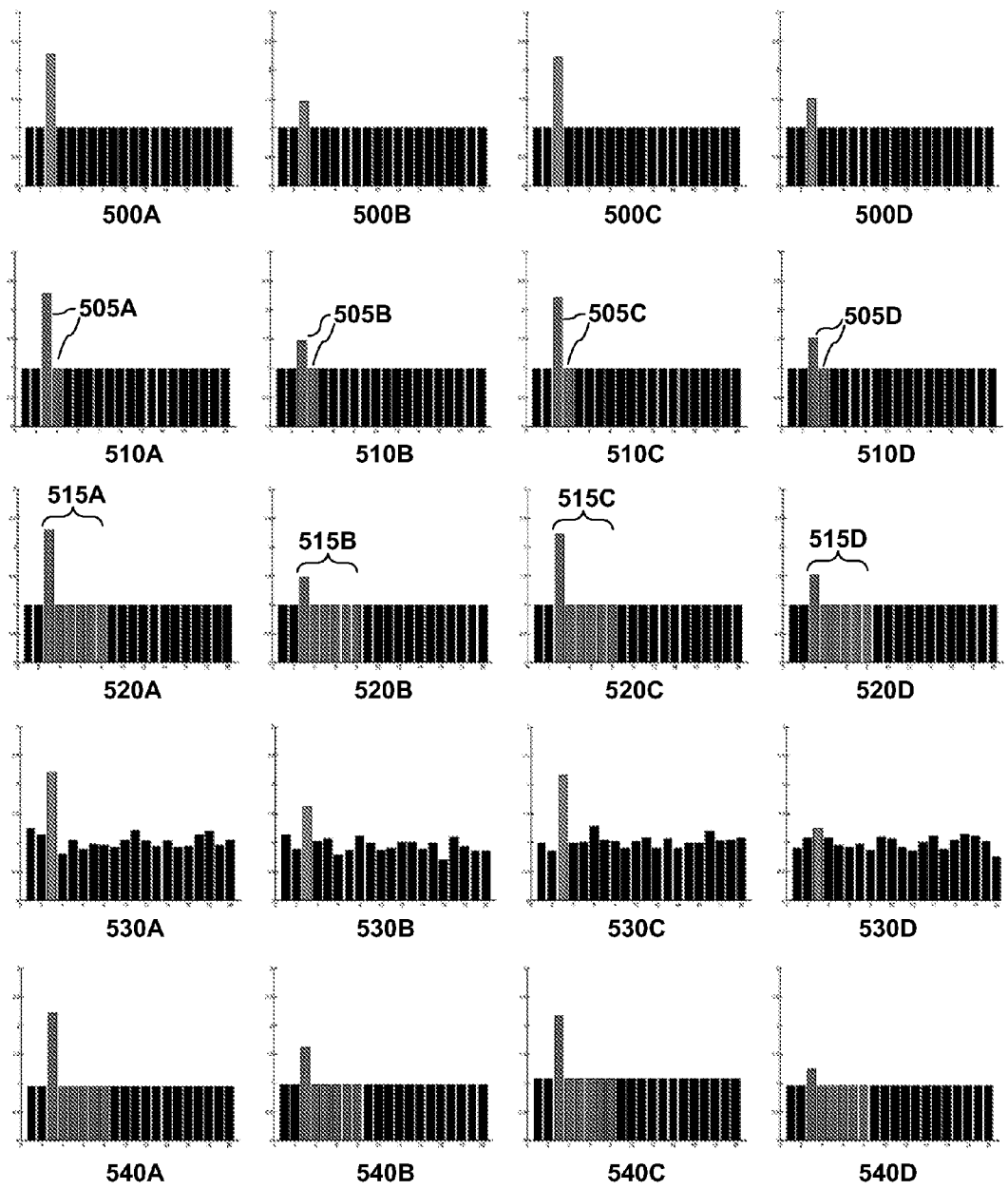
FIG. 5 depicts the results obtainable from an exemplary use of aspects of the present invention to identify robust features capable of reliably representing a set of one-dimensional data.

FIG. 5 depicts the results obtainable from an exemplary use of aspects of the present invention to identify robust features capable of reliably representing a one-dimensional dataset, which is illustrated in charts 500A-500D. Each of the one-dimensional data consists of 20 measurements (i.e., each chart may be thought of as a 1-by-20 vector). For simplicity in this first example, all the 20 values per chart 500A-500D are fixed except the measurement at the third instance in each chart. For any of such segments, the values of the 20 measurements can be determined by linear combination of K=2 bases. One basis represents the static measurements and the other represents the changing value. A number of sample segments are given to construct the two linear bases and further learn the generative features. Four charts of the sample segments are shown in FIG. 5 in charts 500A-500D, where each bar shows the value of one measurement. To highlight the variability of the measurement at the third temporal instance, that corresponding bar is shaded in a manner that contrasts with the shading used for the other, unchanging measurements. It should be noted that the set of measured training sample segments 500A-500D serves as a ground truth against which to evaluate the accuracy of any representation of the data.

The two linear bases may be computed from the given samples using Principal Component Analysis, Independent Component Analysis (ICA), or the like. Since each basis is a vector of 20 one-dimensional coordinates, the two bases form a 20-by-2 basis matrix, B, as described in Equation B. Since the basis number, K, is 2, as discussed above, the minimum number of the generative features is 2, which are sufficient to uniquely fit the linear model and reconstruct the entire data set. Intuitively, the only changing measurement has to be included in the generative features to represent the variations of the one-dimensional signals. FIG. 5 (charts 510A-510D) shows the two robust generative features 505A-505D, which appear in a different shade, to which the singular value product of the corresponding coordinate matrix, B, is the maximum. Effectively, the changing measurement is chosen as one of the robust generative features.

To test the robustness of the generative features, Gaussian white noise is added to the original measurements and the noisy measurements corresponding to the two generative features alone are used to fit the model and reconstruct the entire measurements. Charts 530A-530D in FIG. 5 depicts the original measurements (500A-500D), the ground truth, plus 10% noise. The Frobenius norm of the added noise is 10% of the Frobenius norm of the original measurements. The reconstruction error relative to the ground truth measurements is 9.6%, which was calculated as discussed with reference to Equation I. Assuming an acceptable reconstruction error threshold of 5%, more measurements need to be included in the generative features. When the number of generative features increases, the maximum singular value product increases, and the reconstruction error decreases. The desired reconstruction error, in this example less than 5%, is achieved when the number of generative features is six, where the maximum singular value product is 0.5130. Charts 520A-520D show the extracted six generative features 515A-515D, which appear in a different shade from the other features. Charts 540A-540D in FIG. 5 display the reconstructed data using only the noisy measurements of the six generative features. It should be noted that the reconstructed signals 540A-540D are quite close to the ground truth measurements 500A-500D.

Figure 6:
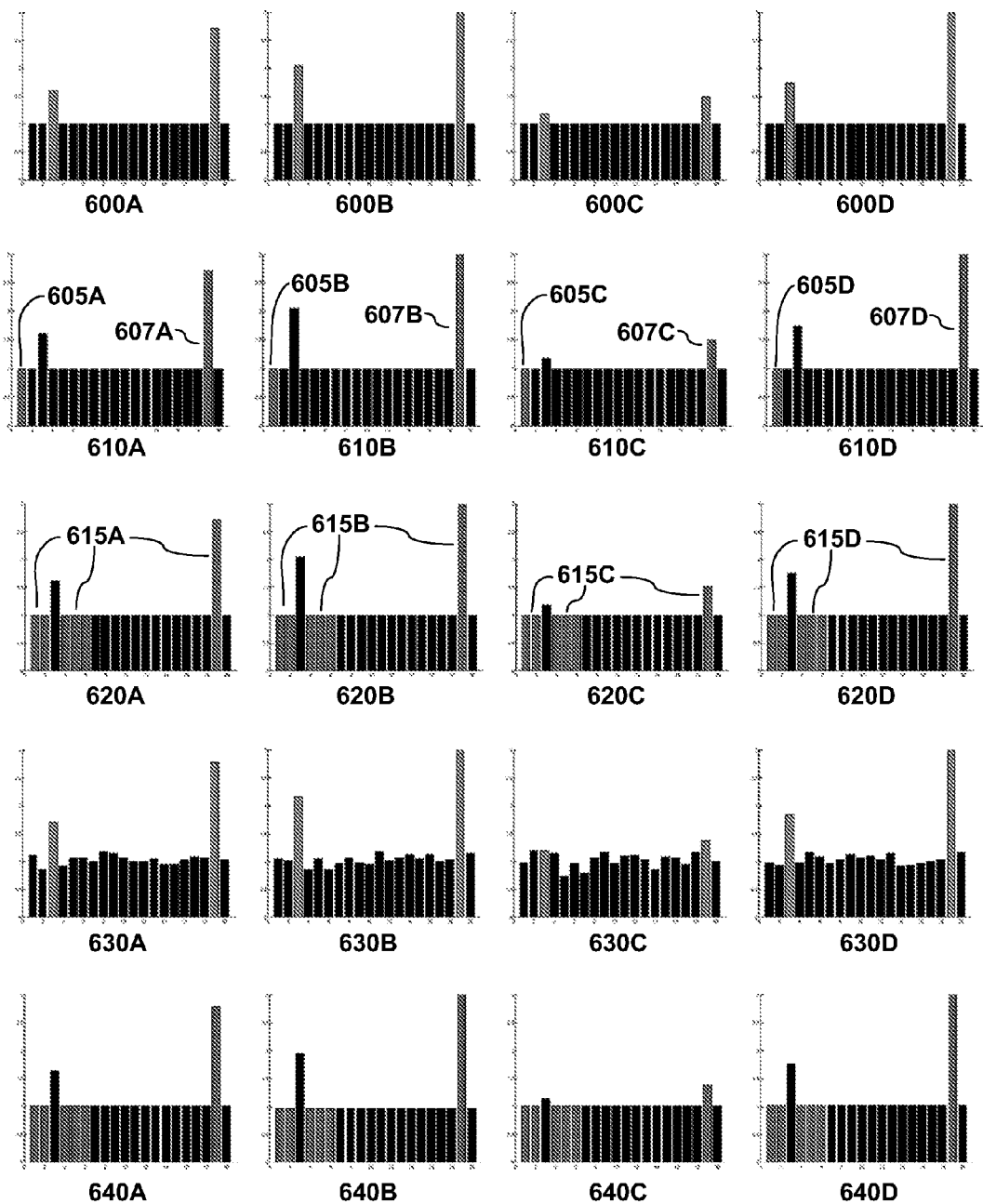
FIG. 6 depicts the results obtainable from a second exemplary use of aspects of the present invention to identify robust features capable of reliably representing a set of one-dimensional data.

FIG. 6 depicts another example of one-dimensional data 600A-600D upon which generative features may be extracted according to embodiments of the present invention. As shown charts 600A-600D of FIG. 6, two measurements per chart change simultaneously instead of only one measurement as was the case in the previous example. As with the prior example, the measurements are controlled by two linear bases, one basis for the static part and one basis for the dynamic part, and the minimum number of the generative features is 2. To better represent the variations of the data, the varying measurement with the greater variance rather than the other varying measurement should be included in the generative features. Indeed, as shown in FIG. 6, charts 610A-610D, the two robust generative features extracted using the teachings of the present invention consists of one feature from the static measurements 605A-605D and the other generative feature is the changing measurement that has the greater variance 607A-607D. When ten percent Gaussian white noise is added to the original measurements, the reconstruction error using only the noisy measurements of the two generative features alone is 7.3%. Charts 630A-630D depict the noisy measurements.

To satisfy the same reconstruction error (<5%), the process is iterated and a satisfactory reconstruction error is achieved when the number of generative features is six. Charts 620A-620D show in FIG. 6 show the extracted six generative features 615A-615D, which appear in a different shade from the other, non-selected features. Because most of the measurements are fixed, the selected features are mostly the static measurements to represent the entire segments robustly. Charts 640A-640D display the reconstructed data using the noisy measurements of the six generative features alone.

Once again, the reconstructed signals (640A-640D) are very close to the ground truth (600A-600D).

Figure 7:
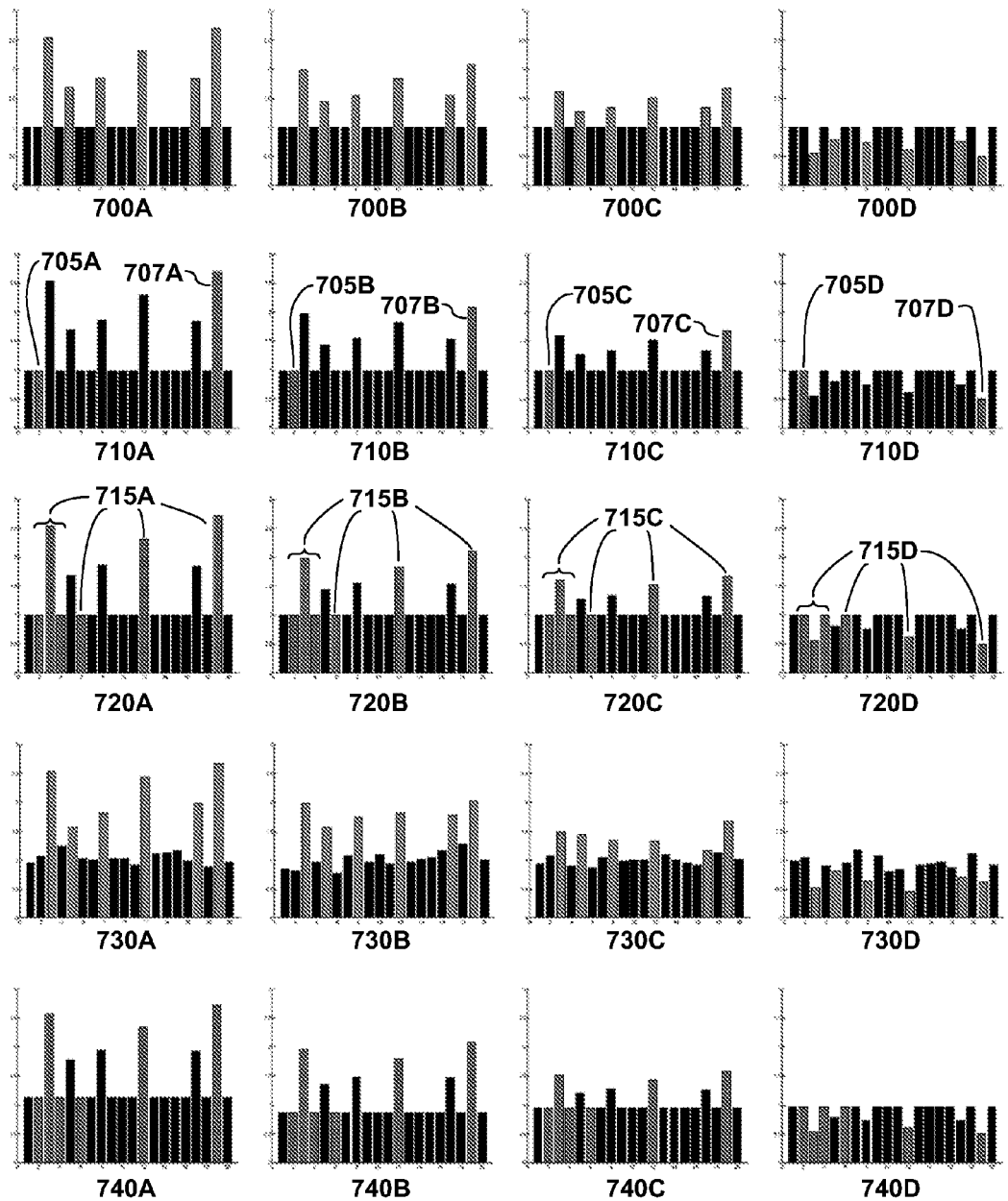
FIG. 7 depicts the results obtainable from a third exemplary use of aspects of the present invention to identify robust features capable of reliably representing a set of one-dimensional data.

FIG. 7 depicts a third example of one-dimensional data 700A-700D upon which generative features may be extracted according to embodiments of the present invention. As shown in FIG. 7, in this third example, six measurements per segment vary simultaneously and the others are static. Four sample segments are shown in FIG. 7 in charts 700A-700D. Once again, the measurements are controlled by two linear bases, one basis for the static part and one basis for the varying part, and the minimum number of the generative features is 2.

As shown in FIG. 7, charts 710A-710D, the two robust generative features extracted using the teachings of the present invention consists of two features 705A-705D and 707A-707D. One feature 705A-705D comes from the static measurements and the other feature 707A-707D is the varying measurement with the greatest variance, which is consistent with intuition.

Once again, noise is added to the samples. Charts 730A-730D depict the noise-added measurements. Using the two generative features, the reconstruction error when 10% Gaussian noise is present is 7.6%. Using six generative features, a desired reconstruction error of less than <5% is achieved. Of course, one skilled in the art shall recognize that different values of reconstruction error may be used.

Charts 720A-720D in FIG. 7 show the extracted six generative features 715A-715D, wherein three of the six generative feature are from the varying measurements since the varying part is no longer a small portion of segment. As expected, the selected three varying features have the greater variance than the other three varying measurements.

Charts 740A-740D display the reconstructed data using the noisy measurements of the six generative features alone. Once again, the reconstructed signals (740A-740D) are very close to the ground truth (700A-700D).

It shall be noted that the above examples were provided by way of illustration and not limitation. One skilled in the art shall recognize that the present invention can be applied to other situations, including without limitation to other data sizes and number of dimensions. Furthermore, different levels of noise and different reconstruction error levels may be used.

Figure 8:
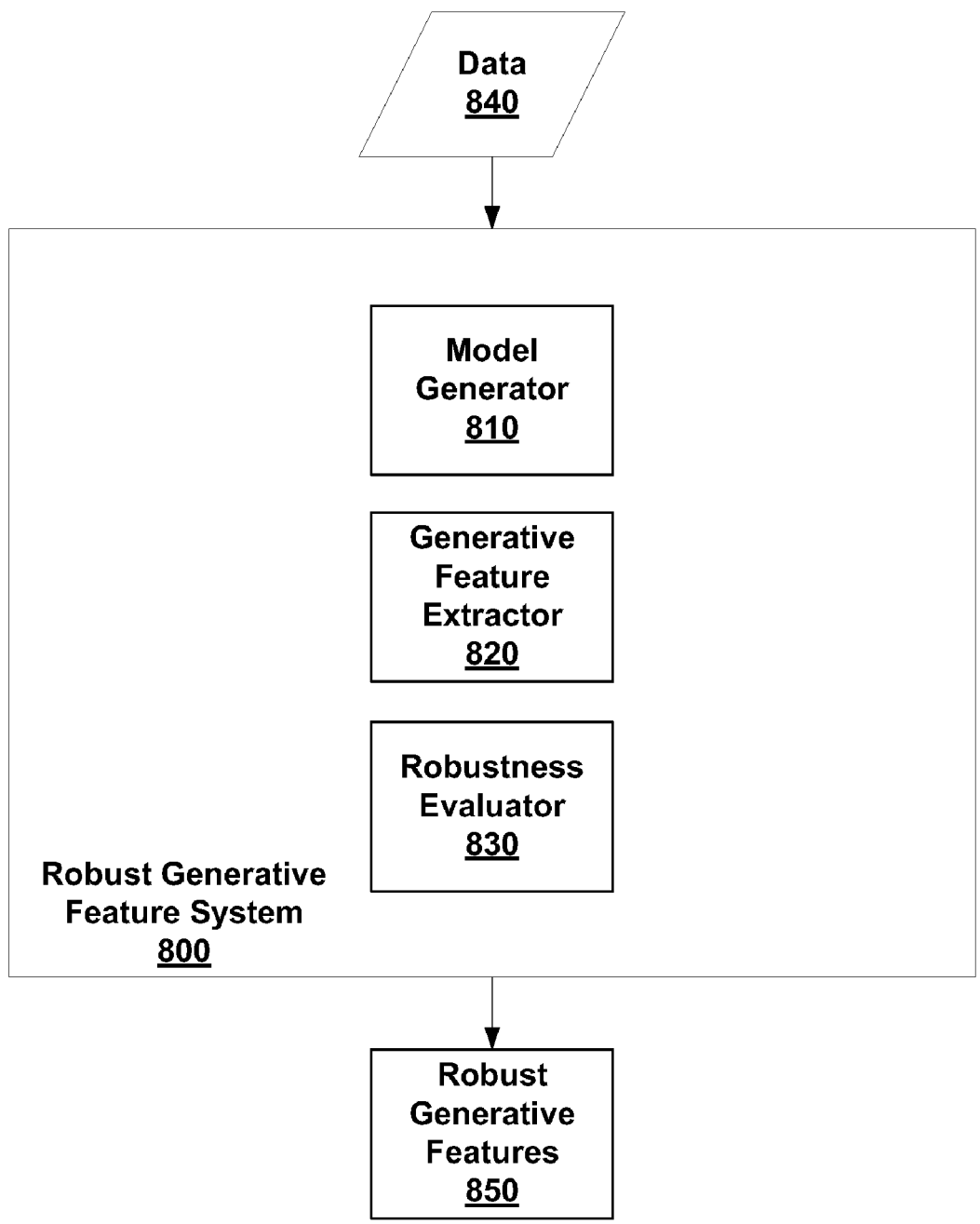
FIG. 8 illustrates a system that generates a set of robust features with which to represent data according to embodiments of the present invention.

FIG. 8 depicts an embodiment of a robust generative features system 800 according to embodiments of the present invention. System 800 is capable of developing a set of robust features 850 with which to represent a set of data 840. As an overview, system 800 includes a model generator 810 that produces a linear generative model using data 840. By way of example and not limitation in an embodiment, model generator 810 produces the linear generative model using Principal Component Analysis, Independent Component Analysis (ICA), or the like.

System 800 also includes a generative feature extractor 820. Generative feature extractor 820 uses the linear generative model produced by the model generator 810 to arrive at a test set of features that are possibly capable of accurately fitting and reconstructing data 840. In embodiments, generative feature extractor 820 identifies a number of candidate test sets of features and ascertains the robustness of the test sets of features to fit and reconstruct the data 840. In embodiments, generative feature extractor 820 gauges the robustness of a test set of features by examining the singular value product of the test set of features, and generative feature extractor 820 extracts as the test set of generative features that set of features that produces a maximum singular value product. This test set of features is provided to robustness evaluator 820 for further evaluation.

Robustness evaluator 830 verifies the ability of the extracted test set of features to reproduce the data 840 within a set level of error. In embodiments, robustness evaluator 830 adds noise to the data 840 and uses the part of model bases corresponding to the test set of features and the noise-added initial data corresponding to the test set of features to generate estimated coefficients for the linear generative model. Using the estimated coefficients and the linear generative model, robustness evaluator 830 reconstructs the data 840. In embodiments, robustness evaluator 830 makes a comparison of the pre-noise-added data to the corresponding reconstructed data to determine the reconstruction error. In embodiments, if the reconstruction error is less than a robustness error threshold, system 800 outputs the set of features as the robust generative features 850. In embodiments, if the reconstruction error is greater than a robustness error threshold, generative feature extractor 820 selects a larger test set of features and the process is iterated until a robustness condition or conditions have been satisfied. In embodiments, a robustness condition may be satisfied when the robustness of the test set of features complies with the robustness threshold. Alternatively, despite the robustness evaluator calculating a robustness error greater than the robustness threshold, a robustness condition may be satisfied if the difference in reconstruction error value between successive test sets of features is below a threshold amount. Alternatively, despite the robustness evaluator calculating a robustness error greater than the robustness threshold, a robustness condition may be satisfied if the difference of the maximum singular value products between two consecutive iterations is below a threshold level. If, through this iterative process, all of features are included in the test set of features, system 800 may terminate, or alternatively, may output the entire set as the robust generative features 850.

It shall be noted that the present invention may be implemented in any instruction-execution/computing device or system capable of processing the data, including without limitation, a general-purpose computer and a specific computer, such as one intended for data processing. The present invention may also be implemented into other computing devices and systems, including without limitation, a digital camera, a printer, a scanner, a multiple function printer/scanner, a facsimile machine, a multimedia device, and any other device that processes, captures, transmits, or stores data. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 9:
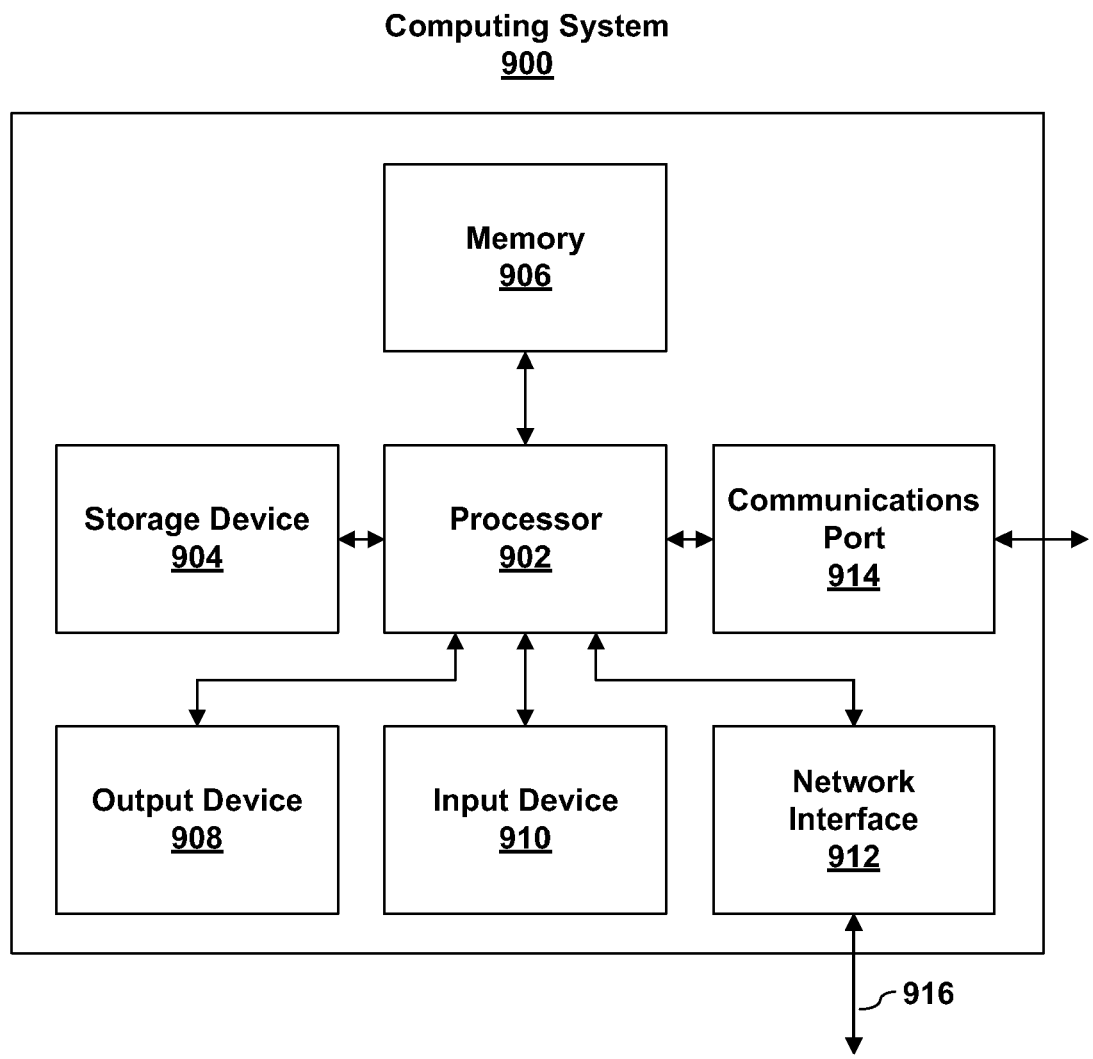
FIG. 9 depicts a block diagram of a computing system according to various embodiments of the invention.

FIG. 9 depicts a functional block diagram of an embodiment of an instruction-execution/computing device 900 that may implement or embody embodiments of the present invention. As illustrated in FIG. 9, a processor 902 executes software instructions and interacts with other system components. In an embodiment, processor 902 may be a general purpose processor such as an AMD processor, an INTEL processor, a SUN MICROSYSTEMS SPARC, or a POWERPC compatible-CPU, or other brand of processor, or the processor may be an application specific processor or processors. A storage device 904, coupled to processor 902, provides long-term storage of data and software programs. Storage device 904 may be a hard disk drive and/or another device capable of storing data, such as a computer-readable media (e.g., diskettes, tapes, compact disk, DVD, and the like) drive or a solid-state memory device. Storage device 904 may hold programs, instructions, and/or data for use with processor 902. In an embodiment, programs or instructions stored on or loaded from storage device 904 may be loaded into memory 906 and executed by processor 902. In an embodiment, storage device 904 holds programs or instructions for implementing an operating system on processor 902. In embodiments, possible operating systems include, but are not limited to, UNIX, AIX, LINUX, Microsoft Windows, and the Apple MAC OS. In embodiments, the operating system executes on, and controls the operation of, the computing system 900.

An addressable memory 906, coupled to processor 902, may be used to store data and software instructions to be executed by processor 902. Memory 906 may be, for example, firmware, read only memory (ROM), flash memory, non-volatile random access memory (NVRAM), random access memory (RAM), or any combination thereof. In one embodiment, memory 906 stores a number of software objects, otherwise known as services, utilities, components, or modules. One skilled in the art will also recognize that storage 904 and memory 906 may be the same items and function in both capacities. In an embodiment, one or more of the components of FIG. 8 may be modules stored in memory 904, 906 and executed by processor 902.

In an embodiment, computing system 900 provides the ability to communicate with other devices, other networks, or both. Computing system 900 may include one or more network interfaces or adapters 912, 914 to communicatively couple computing system 900 to other networks and devices. For example, computing system 900 may include a network interface 912, a communications port 914, or both, each of which are communicatively coupled to processor 902, and which may be used to couple computing system 900 to other computer systems, networks, and devices.

In an embodiment, computing system 900 may include one or more output devices 908, coupled to processor 902, to facilitate displaying graphics and text. Output devices 908 may include, but are not limited to, a display, LCD screen, CRT monitor, printer, touch screen, or other device for displaying information. Computing system 900 may also include a graphics adapter (not shown) to assist in displaying information or images on output device 908.

One or more input devices 910, communicatively coupled to processor 902, may be used to facilitate user input. Input device 910 may include, but are not limited to, a pointing device, such as a mouse, trackball, or touchpad, and may also include a keyboard or keypad to input data or instructions into computing system 900.

In an embodiment, computing system 900 may receive input, whether through communications port 914, network interface 912, stored data in memory 904/906, or through an input device 910, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for selecting sufficient dominant features for representing a collection of data, said method comprising the steps of:
   (a) computing a linear model using training data selected from among said collection of data, said linear model defining a plurality of characteristic features;
   (b) selecting a sub-set of potential dominant features from among the plurality of characteristic features;
   (c) determining a measure of the accuracy with which the current sub-set of potential dominant features accurately represent said collection of data; and
   (d) in response to said measure of accuracy not meeting a predefined first threshold, defining a new sub-set of potential dominant features from among the plurality of characteristic features, wherein said new sub-set is bigger than, and replaces, the immediately previous sub-set of potential dominant features, and returning to step (c);
   (e) defining the current sub-set of potential dominant features as said sufficient dominant features for representing said collection of data.

2. A method as recited in claim 1, wherein the step of computing a linear model is conducted using principal component analysis or independent component analysis.

3. A method as recited in claim 1, wherein in step (b), the selecting of a sub-set of potential dominant features from the among the plurality of characteristic features comprises the steps of:
   generating a plurality of candidate sets of features, each defining a candidate matrix;
   calculating the singular values for each candidate matrix, and determining the singular value product for each candidate matrix; and
   selecting for use as the sub-set of potential dominant features the candidate set of features having the largest singular value product.

4. A method as recited in claim 1, wherein the measure of the accuracy with which said sub-set of potential dominant features accurately represent said collection of data is a reconstruction error value and the first threshold is a reconstruction error threshold.

5. A method as recited in claim 4, wherein step (c) of determining a measure of the accuracy comprises the steps of:
   adding noise to at least some of the collection of data to produce noise-added data;

using at least some of the noise-added data and a part of, a set of model bases from the linear model that correspond to the sub-set of potential dominant features to calculate estimated coefficients for the linear model;

using the estimated coefficients and the linear model to generate reconstructed data; and calculating a reconstruction error value for at least some of the reconstructed data relative to the corresponding at least some of the data used to produce the noise-added data.

6. The method of claim 1, wherein step (c) includes skipping step (d) in response to a difference in a currently determined measure of reliability and an immediately previously determined measure of reliability being below a second threshold value; or in response to all of said characteristic features having been included in the current sub-set of potential dominant features.

7. A computer-readable medium comprising one or more sequences of instructions which, when executed by one or more processors, cause the one or more processors to perform at least the steps of claim 1.

8. The method of claim 1, wherein said sub-set of potential dominant features are selected from among the plurality of characteristic features having the lowest noise sensitivity.

9. The method of claim 1, wherein:

the collection of data may be uniquely determined by a combination of coefficients of K model bases, said K model bases being comprised of said characteristic features and being arranged into a matrix, B, having K columns, wherein each row in matrix B correlates to the same characteristic feature;

said sub-set of potential dominant features is comprised of K potential dominant features corresponding to K rows in said matrix B, said K rows defining a K-by-K sub-matrix $\hat{B}$ of matrix B.

10. The method of claim 9, wherein in step (d), the new sub-set of potential dominant features are selected such that the Frobenius norm of $\hat{B}$ is increased as compared to that of the immediately previous sub-set of potential dominant features.

11. The method of claim 9, further including:
denoting the K singular values of $\hat{B}$ as $s_1, \ldots, s_K$, where $s_1 \geq \ldots \geq s_K$; and
the features corresponding to the largest singular values are selected for the new sub-set of potential dominant features.

12. The method of claim 9, further including:
denoting the K singular values of $\hat{B}$ as $s_1, \ldots, s_K$, where $s_1 \geq \ldots \geq s_K$; and
the new sub-set of potential dominant features are selected to increase the following relationship, as compared to the immediately previous sub-set of potential dominant features:

$$\|\hat{B}\|^2 = \sum_{k=1}^{K} s_k^2,$$

where $\|\hat{B}\|$ is the Frobenius norm of $\hat{B}$.

13. The method of claim 9, further including:
denoting the K singular values of $\hat{B}$ as $s_1, \ldots, s_K$, where $s_1 \geq \ldots \geq s_K$; and
the new sub-set of potential dominant features are selected such that their corresponding singular value product is increased as compared to the immediately previous sub-set of potential dominant features.

14. The method of claim 13, wherein the K singular values are obtained using singular value decomposition.

15. A method for developing a generative model for a collection of data, said method comprising the steps of:

(a) computing a linear model using training data selected from among said collection of data, said linear model defining K model bases wherein the collection of data may be uniquely determined by a combination of coefficients of the K model bases, said K model bases being comprised of characteristic features and being arranged into a matrix, B, having K columns, wherein each row in matrix B correlates to the same characteristic feature;

(b) selecting K potential dominant features from among the characteristic features to K rows in said matrix B, said K rows defining a K-by-K sub-matrix $\hat{B}$ of matrix B;

(c) determining a measure of the accuracy with which the current sub-matrix $\hat{B}$ accurately represent said collection of data; and (d) in response to said measure of accuracy not meeting a predefined threshold, defining a new sub-matrix $\hat{B}$ of potential dominant features from among the characteristic features, wherein said new sub-matrix is bigger than, and replaces, the immediately previous sub-matrix, and returning to step (c); and (e) defining the current sub-matrix $\hat{B}$ as said generative model.

16. The method of claim 15, wherein in step (d), the new sub-matrix $\hat{B}$ of potential dominant features is selected such that the Frobenius norm of $\hat{B}$ is increased as compared to that of the immediately previous sub-matrix.

17. The method of claim 15, further including:
denoting the K singular values of $\hat{B}$ as $s_1, \ldots, s_K$, where $s_1 \geq \ldots \geq s_K$; and
in step (d), the features corresponding to the largest singular values are selected for the new sub-matrix of potential dominant features.

18. The method of claim 15, further including:
denoting the K singular values of $\hat{B}$ as $s_1, \ldots, s_K$, where $s_1 \geq \ldots \geq s_K$; and
in step (d), the new sub-matrix of potential dominant features are selected to increase the following relationship, as compared to the immediately previous sub-matrix of potential dominant features:

$$\|\hat{B}\|^2 = \sum_{k=1}^{K} s_k^2,$$

where $\|\hat{B}\|$ is the Frobenius norm of $\hat{B}$.

19. The method of claim 15, further including:
denoting the K singular values of $\hat{B}$ as $s_1, \ldots, s_K$, where $s_1 \geq \ldots \geq s_K$; and
in step (d), the new sub-matrix of potential dominant features are selected such that their corresponding singular value product is increased as compared to the immediately previous sub-matrix of potential dominant features.

20. A system for developing a generative model, comprising a processing unit for implementing the method of claim 15.

* * * * *